United States Patent [19]
Tariki et al.

[11] Patent Number: 5,861,917
[45] Date of Patent: Jan. 19, 1999

[54] FOCUS DETECTION USING AN IMAGE SIGNAL EXTRACTED BEFORE DIGITAL SIGNAL PROCESSING

[75] Inventors: Motoi Tariki, Sagamihara; Hideyuki Arai, Kawasaki, both of Japan

[73] Assignee: Canon Kabushiki Kaisha, Tokyo, Japan

[21] Appl. No.: 523,168

[22] Filed: Sep. 5, 1995

Related U.S. Application Data

[63] Continuation of Ser. No. 135,444, Oct. 13, 1993, abandoned.

[30] Foreign Application Priority Data

Oct. 19, 1992 [JP] Japan ................................. 4-306165

[51] Int. Cl.$^6$ .......................... H04N 5/235; H04N 5/262; H04N 5/225
[52] U.S. Cl. .......................... 348/230; 348/240; 348/249; 348/358; 382/300
[58] Field of Search .................................. 348/207, 240, 348/230, 345, 349, 350, 353, 358, 362; 382/300

[56] References Cited

U.S. PATENT DOCUMENTS

| 4,709,147 | 11/1987 | Arai .......................................... 250/234 |
| 4,843,475 | 6/1989 | Imai .......................................... 342/240 |
| 4,963,981 | 10/1990 | Todaka et al. ...................... 358/213.13 |
| 5,150,217 | 9/1992 | Senuma et al. .......................... 358/227 |
| 5,223,934 | 6/1993 | Hong ........................................ 358/209 |
| 5,225,940 | 7/1993 | Ishii et al. ................................ 359/823 |
| 5,253,064 | 10/1993 | Yamamoto et al. ..................... 358/180 |
| 5,517,239 | 5/1996 | Nakayama .............................. 348/240 |

Primary Examiner—Bipin Shalwala
Attorney, Agent, or Firm—Fitzpatrick, Cella, Harper & Scinto

[57] ABSTRACT

In an image pickup apparatus having an electronic zooming function for enlarging and interpolating an image by electronic image processing of an image pickup signal output from an image pickup device, a focus is detected by extracting a predetermined focal signal varying depending upon a focal state from the image pickup signal before the image pickup signal undergoes enlargement/interpolation processing by electronic zooming.

31 Claims, 6 Drawing Sheets

FOCUS DETECTION USING AN IMAGE SIGNAL EXTRACTED BEFORE DIGITAL SIGNAL PROCESSING

This application is a continuation of application Ser. No. 08/135,444 filed Oct. 13, 1993 now abandoned.

BACKGROUND OF THE INVENTION

1. Field of the Invention

This invention relates to an image pickup apparatus having an electronic zooming function for electronically increasing the magnification of an image of an object.

2. Description of the Related Art

Recently, video apparatuses such as video cameras and integrated camera/video recorders have been remarkably improved and the development of this kind of video apparatus having various functions and improved operability has been promoted. For example, automatic focusing mechanisms are presently provided as standard equipment, and electronic zooming functions for electronically increasing the image magnification by processing an image signal are now being introduced to realize large-magnification zooming without using a large optical zooming lens.

The automatic focusing method mainly used in conventional automatic focusing systems is a method in which a signal formed of high-frequency components, edge components or the like and representing the sharpness is extracted from an image pickup signal to determine a focal state. This method is characterized in that an object can be focused no matter what the distance to the object, and that there is no need to provide a special optical system and a sensor for detecting the focus.

However, with respect to the construction of conventional image pickup apparatuses having an electronic zooming device and an automatic focusing system using an image pickup signal, a problem described below is encountered.

That is, an electronic zooming apparatus conventionally used is arranged to electronically increase the magnification of an image of an object by intermittently reading out an image pickup signal from an image pickup device at a transfer rate determined by the magnification of the object image, by forming an interpolation signal from the read-out image pickup signal, and inserting the interpolation signal in the read-out image pickup signal. In an image pickup apparatus constructed by incorporating an automatic focusing system with this zooming apparatus, an image pickup signal processed to electronically increase the magnification by such interpolation/insertion is used as a signal for determining focused/non-focused states in an automatic focusing circuit.

Accordingly, a signal which is interpolated but thinned-out in a horizontal direction is used to determine focused/non-focused states, and a particular frequency component or edge component extracted from such a signal is different from the corresponding frequency component or edge component extracted from the original image pickup signal. There is therefore a problem of occurrence of a deterioration in the automatic focusing accuracy or a malfunction.

SUMMARY OF THE INVENTION

In view of the above-described problem, an object of the present invention is to provide an image pickup apparatus which is capable of operating stably and reliably and which does not cause any deterioration in the accuracy of an automatic focusing system for detecting a focal state from an image pickup signal in a video camera having the image pickup apparatus, the automatic focusing system and an electronic zooming apparatus.

Another object of the present invention is to provide an image pickup apparatus arranged to prevent influence upon the automatic focusing operation even when electronic zooming is performed.

To achieve these objects, according to one aspect of the present invention, there is provided an image pickup apparatus comprising enlargement means for electronically increasing the magnification of an image of an object by intermittently reading out an image pickup signal from an image pickup device at a transfer rate according to the magnification of the object image, by forming an interpolation signal from the read-out image pickup signal and by inserting the interpolation signal in the image pickup signal, extraction means for extracting a particular signal component varying depending upon a focal state from the image pickup signal intermittently read out from the image pickup device but not yet interpolated, determination means for determining focused/non-focused states on the basis of the signal component extracted by the extraction means, and focusing control means for controlling focusing on the basis of a result of the determination of focused/non-focused states made by the determination means.

The extraction means extracts, as the signal used for the focusing control effected by the determination means and the focusing control means, a particular frequency component or an edge component from the image pickup signal intermittently read out from the image pickup device but not yet interpolated, i.e., the original image pickup signal which has been intermittently read out in the vertical direction but which has not undergone the intermittent-reading/insertion/interpolation processing in the horizontal direction, when an electronic zooming control is performed. The determination means and the focusing control means are thereby enabled to perform focusing stably and accurately by preventing a deterioration in accuracy and a malfunction even during the electronic zooming control.

A further object of the present invention is to provide an automatic focusing apparatus capable of operating accurately and stably irrespective of the field angle.

These and other objects, features and advantages of the present invention will become apparent from the following detailed description of preferred embodiments of the present invention taken in conjunction with the accompanying drawings.

DESCRIPTION OF THE PREFERRED EMBODIMENTS

Figure 3:
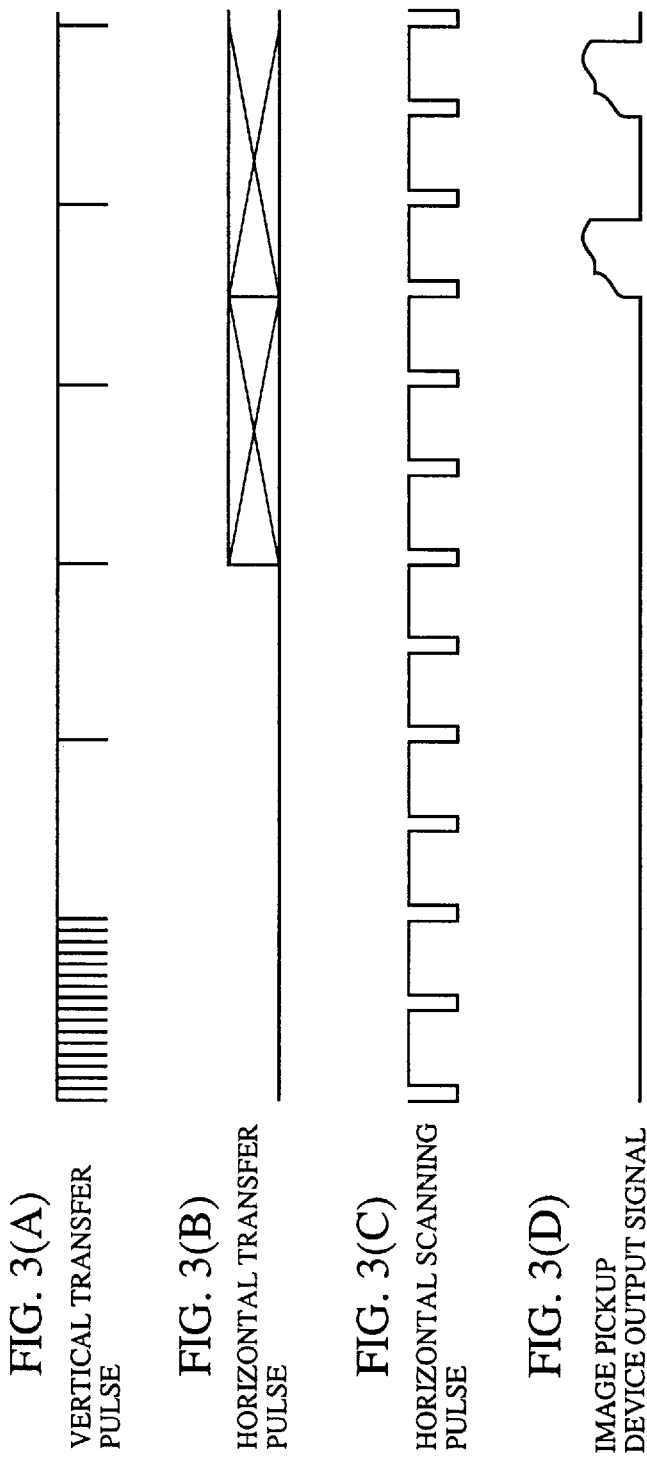
FIGS. 3(A), 3(B), 3(C) and 3(D) constitute a waveform diagram showing scanning timing of the image pickup device when electronic zooming is performed.
Figure 4:
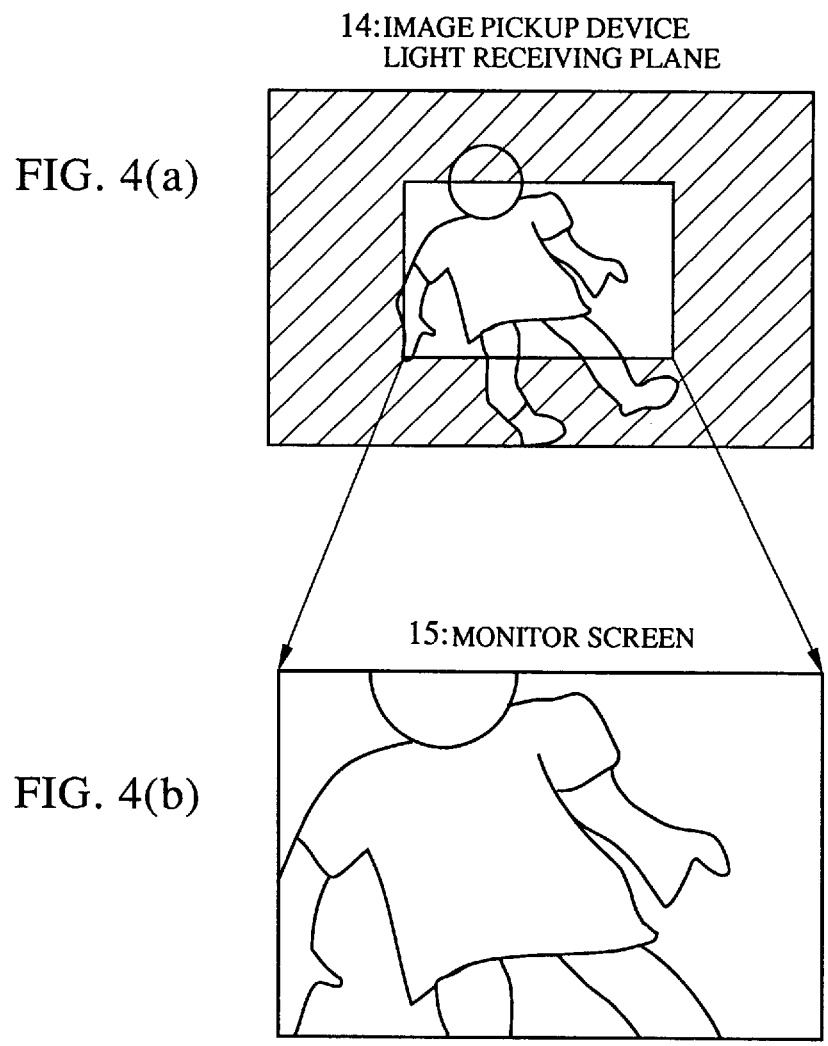
FIGS. 4(a) and 4(b) are diagrams of images of an object when the image magnification is increased by electronic zooming.

An image pickup apparatus in accordance with the present invention will be described below with respect to embodiments thereof with reference to the accompanying drawings. An electronic zooming function will first be described with reference to FIGS. 2 through 4.

Figure 2:
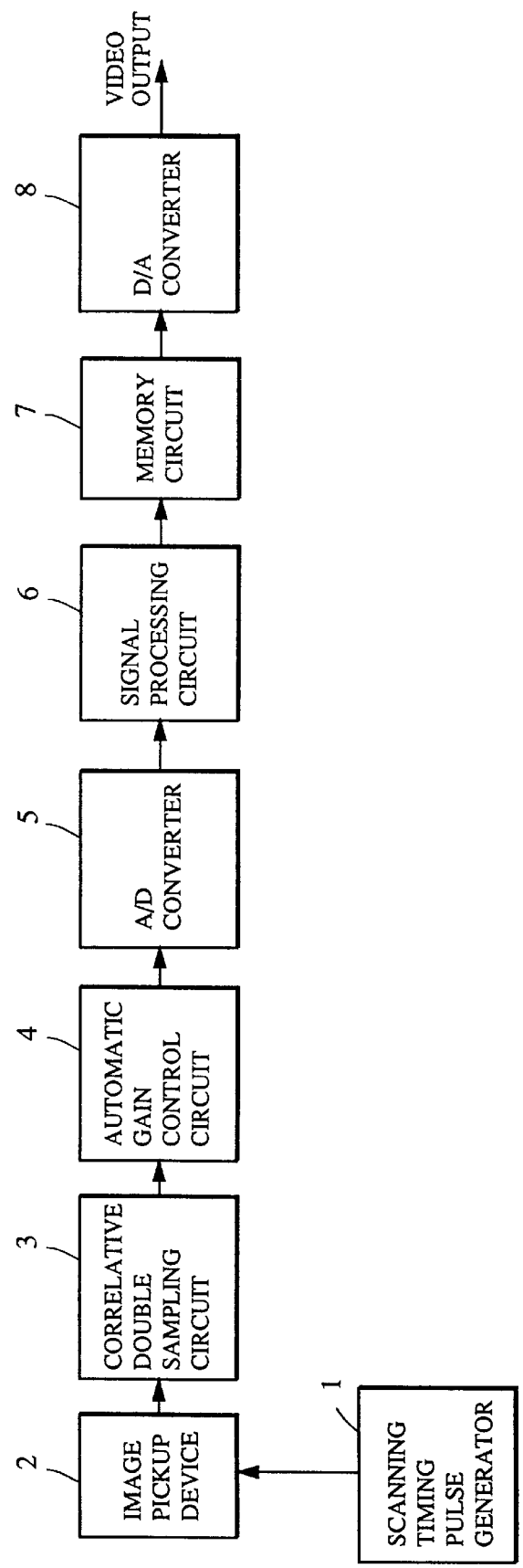
FIG. 2 is a block diagram schematically showing the construction of an image pickup apparatus having an electronic zooming function.

FIG. 2 is a block diagram schematically showing the construction of an image pickup apparatus having an electronic zooming function. The image pickup apparatus has a scanning timing pulse generation means 1 for controlling scanning timing of an image pickup device 2, the image pickup device 2, formed of a charge coupled device (CCD) or the like, a correlative double sampling circuit 3, an automatic gain control circuit 4, an A/D converter 5 for converting an image pickup signal into a digital signal, a camera signal processing circuit 6, an image memory circuit 7, and a D/A converter 8. FIGS. 3(A), 3(B), 3(C) and 3(D) constitute a waveform diagram of scanning timing of the image pickup device 2, showing vertical transfer pulses FIG. 3(A), horizontal transfer pulses FIG. 3(B), horizontal scanning pulses FIG. 3(C), and an image pickup device output signal FIG. 3(D). Vertical transfer pulses FIG. 3(A), horizontal transfer pulses FIG. 3(B), horizontal scanning pulses FIG. 3(C) are generated by the scanning timing pulse generation means 1. FIGS. 4(a) and 4(b) show images of an object in picture frames when zooming is performed. FIG. 4(a) schematically shows an object image on a light receiving plane of the image pickup device 2. A region of the image to be enlarged is surrounded by a smaller frame, while the rest of the entire image area, i.e., an unnecessary portion of the image is represented by a hatched area. FIG. 4(b) shows an enlarged object image on a monitor screen 15.

Only an image region on the image pickup device light receiving plane 14 to be enlarged, such as that shown in FIG. 4(a), is set as a scanned region by a method described below. As shown in FIG. 3(A), with respect to the region other than the enlarged image region, vertical transfer pulses 3(A) for driving a vertical CCD (not shown) in the image pickup device 2 are initially supplied at a higher rate to rapidly sweep off an unnecessary charge corresponding to upper and lower portions of the hatched area of the image pickup device light receiving plane shown in FIG. 4(a). With respect to the enlarged image region, if, for example, the image magnification is to be increased to 2, the image pickup device output signal FIG. 3(D) is read out by generating one vertical transfer pulse FIG. 3(A) in the period of supplying two horizontal scanning pulses FIG. 3(C). That is, in a case where the image magnification is increased to 2, 3, . . . on the basis of a control signal from the scanning timing pulse generation means 1 in order to intermittently read out, in the vertical direction, signals in the horizontal scanning direction in accordance with the transfer rate corresponding to the magnification, the image pickup device output signal FIG. 3(D) is read out from the image pickup device 2 by being thinned out one with respect to two, three, . . . scanning lines.

The image pickup device output signal FIG. 3(D) intermittently read out in the vertical direction in this manner is processed by the correlative sampling circuit 3 to remove noise components therein, is controlled by the automatic gain control circuit 4 so that the amplitude gain is automatically maintained at a constant level, and is supplied to the A/D converter 5. The A/D converter 5 converts the image pickup device output signal FIG. 3(D) into a digital signal which undergoes color signal processing and gamma correction and the like in the signal processing circuit 6 and is thereafter supplied to the memory circuit 7. The memory circuit 7 calculates an average value of the image pickup device output signal FIG. 3(D) corresponding to each adjacent pair of scanning lines, and inserts the average value between the two scanning lines, thereby interpolating the signal in the vertical direction. Also, the memory circuit 7 cuts off the part of the image pickup signal corresponding to unnecessary regions at the left and right sides of the light receiving plane 14 of the image pickup device 2 by inhibiting reading or writing of digital data of the image pickup signal corresponding to the unnecessary regions, and effects interpolation in the horizontal direction by intermittently reading the image pickup signal corresponding to the enlarged image region in accordance with the transfer rate corresponding to the magnification and by calculating and inserting an average value of two digital data items of the read-out image pickup signal adjacent in the horizontal direction.

The digital image pickup signal processed for enlargement by interpolation in the vertical and horizontal directions is input to the D/A converter 8 to be reconverted into an analog signal, thereby forming the desired image on the monitor screen 15.

The electronic zooming operation is thus performed. The conventional apparatuses have been arranged in such a manner that the image pickup signal obtained by the above-described enlargement processing and the reconversion into the analog form is supplied to an automatic focusing circuit (not shown) to extract particular components, such as components of particular frequencies, edge components or the like, which vary depending upon a focal state, and focused/non-focused states are determined by the magnitude of these components. Also, a well-known automatic focusing system called a mountaineering servo has widely been used for automatic focusing of conventional apparatuses. Therefore, the problem of a deterioration in accuracy, malfunction and the like is encountered since focus detection is performed on the basis of the signal after the enlargement and interpolation processing, as described above.

Figure 1:
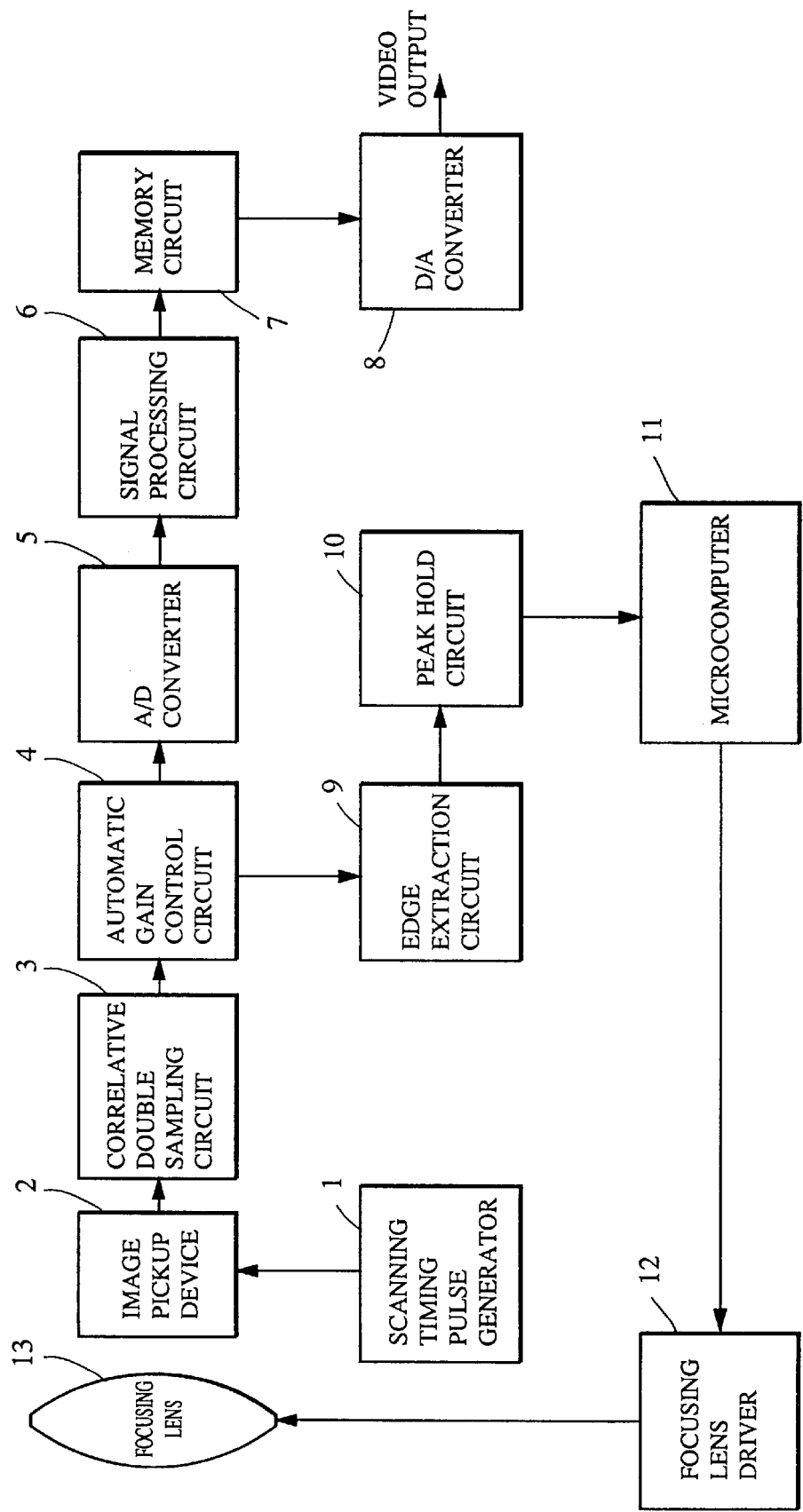
FIG. 1 is a block diagram schematically showing the construction of an image pickup apparatus which has an electronic zooming function and to which an automatic focusing system in accordance with a first embodiment of the present invention is applied.

The present invention has been achieved to solve this problem, and the specific arrangement of the present invention is as illustrated in FIG. 1.

The arrangement shown in FIG. 1 ensures that, even though both an electronic zooming function and an automatic focusing function are provided, the operation can always be performed in optimal conditions without reducing the effect of each function.

The same components as those described above with reference to the block diagram of FIG. 2 are indicated by the same reference characters in FIG. 1, and the description for them will not be repeated.

That is, the image pickup apparatus has an automatic focusing system formed of an edge extraction circuit 9, a peak hold circuit 10, a microcomputer 11 for an overall control of the apparatus, a focusing lens driver 12, and a focusing lens 13, as well as the scanning timing pulse generation means 1, the image pickup device 2, the correlative double sampling circuit 3, the automatic gain control circuit 4, the A/D converter 5, the signal processing circuit 6, the memory circuit 7 and the D/A converter 8 shown in FIG. 2.

The edge extraction circuit 9 serves for detecting edge components for determining a focal state from the image pickup signal, and is connected to the automatic gain control circuit 4. The edge extraction circuit 9 receives a signal from the automatic gain control circuit 4, i.e., the original image pickup signal which has been intermittently read from the image pickup device 2 in the vertical direction on the basis of pulses from the scanning timing pulse generations means 1 (and has been processed by automatic gain control (AGC)) but which is not yet been processed by intermittent-reading/insertion/interpolation processing in the horizontal direction of the memory circuit 7.

The peak hold circuit 10 for detecting a peak value of the edge components, i.e., the maximum of the sharpness, is connected to an output terminal of the edge extraction circuit 9, and the microcomputer 11 is connected to an output terminal of the peak hold circuit 10. A control line of the microcomputer 11 is connected to the focusing lens driver 12. The focusing lens 13 is controlled and moved along the optical axis on the basis of a drive signal from the focusing lens driver 12. The microcomputer 11 controls the overall operation of the image pickup device and has control lines (control bus) connected to all the components of the apparatus. In FIG. 1, however, such control lines are not illustrated while only the control line to the focusing lens driver 12 is illustrated. The microcomputer 11 performs a mountaineering control to maximize the sharpness by driving the focusing lens in a direction such that the output from the peak hold circuit 10 is increased.

The focusing operation under an electronic zooming control, peculiar to this embodiment will now be described below. The electronic zooming control is the same as that of the conventional apparatus, and only the focusing operation will be described.

The original image pickup signal, which has been intermittently read from the image pickup device 2 in the vertical direction but which has not undergone the intermittent-reading/insertion/interpolation processing in the horizontal direction, is supplied from the automatic gain control circuit 4 to the edge extraction circuit 9. The edge extraction circuit 9 then extracts a rising-edge component and a falling-edge component from the supplied original image pickup signal. The extracted rising-edge and falling-edge components are supplied to the peak hold circuit 10. The peak hold circuit 10 holds peak values of the rising-edge component and the falling-edge component in the vertical direction or both in the vertical and horizontal directions. The held peak values are supplied to the microcomputer 11.

The microcomputer 11 compares the supplied peak values of the rising-edge and falling-edge components to determine a focused state or a non-focused state (a fore focus state or a rear focus state). If it determines that the peak values of the rising-edge and falling-edge components are not equal to each other and that the lens is not focused, it forms a focusing lens control signal (for setting the direction of rotation of an unillustrated focusing lens driving motor, starting the rotation and stopping the rotation) on the basis of the difference between the peak values of the rising-edge and falling-edge components, and supplies this signal to the focusing lens driver 12. By the drive signal from the focusing lens driver 12, the focusing lens 13 is controlled and moved along the optical axis to be focused.

As described above, the automatic focusing (AF) control is performed using an AF control signal which is formed on the basis of the original image pickup signal which has been intermittently read out in the vertical direction but which has not undergone the intermittent-reading/insertion/interpolation processing in the horizontal direction, when the electronic zooming control is effected. It is thereby possible to achieve stable accurate focusing free from deterioration in accuracy and a malfunction even during the electronic zooming control.

The present invention is not limited to the above-described embodiment. For example, the determination of focused/non-focused states may be performed by extracting particular frequency components from the signal output from the automatic gain control circuit 4 instead of using an edge signal extracted from the edge extraction circuit 9. Also, the determination of focused/non-focused states may be performed by adding a signal other than the edge component signal and particular frequency components to the information for the determination. Further, a method may be adopted in which a signal formed by processing the output signal from the automatic gain control circuit 4 by gamma correction or kneeing is input to the edge extraction circuit 9.

In the above-described embodiment, as described above in detail, the automatic focusing (AF) control is performed during the electronic zooming control by using an AF control signal which is formed on the basis of the original image pickup signal which has been intermittently read out in the vertical direction but which has not undergone the intermittent-reading/insertion/interpolation processing in the horizontal direction, thereby achieving stable accurate focusing free from a deterioration in accuracy and a malfunction even during the electronic zooming control.

A second embodiment of the present invention will next be described.

While in the first embodiment the automatic focusing control is performed by the electronic zooming function and by using the image pickup signal before processing for enlargement, interpolation and the like to improve the accuracy of automatic focusing and to prevent a malfunction, the second embodiment described below is arranged to improve the accuracy of automatic focusing upon an imaged object by performing automatic focusing in accordance with the actual field angle after processing for enlargement and the like.

That is, in the first embodiment, the automatic focusing control is performed by using the image pickup signal before electronic zoom processing to improve the focus detection accuracy. From the view point of the field angle, however, a problem described below must be discussed. If an image is enlarged by the electronic zooming function and where the field angle of the enlarged portion is smaller than that of the original picture, and if a region for focus detection, i.e., a distance measuring region is larger than or deviates from the region defined by the field angle from which the image is enlarged, there is a risk of a deterioration in the focus detection accuracy, because image information other than information on the image portion within the area defined by the actually-framed field angle is mixed in.

Figure 5:
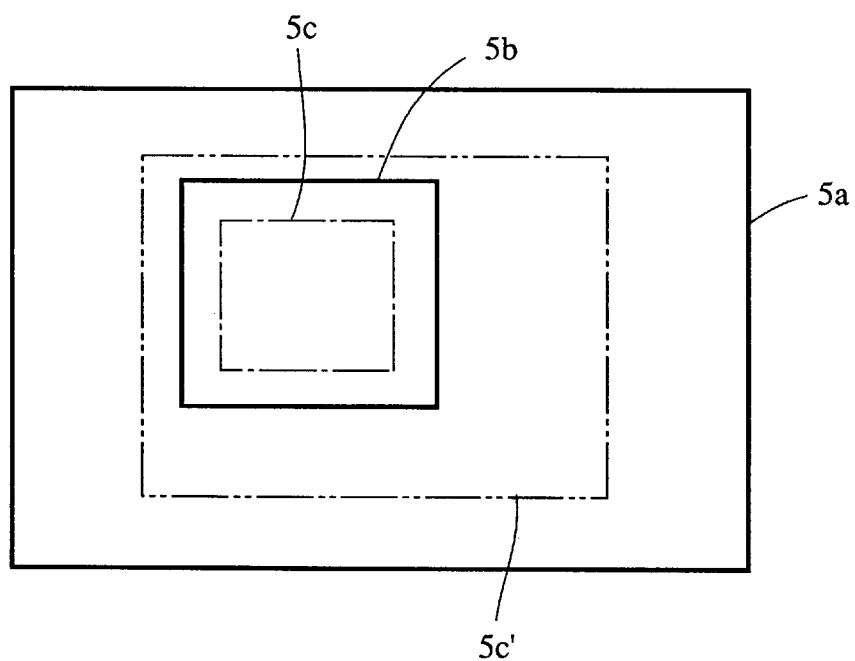
FIG. 5 is a diagram for the explanation of a second embodiment of the invention.

This problem will be described with reference to FIGS. 4(a), 4(b) and FIG. 5. If a distance measuring region is set in an area larger or different from the area corresponding to the field angle from which an image is to be enlarged, as in the case of enlargement from the central image portion other than the hatched portion shown in FIG. 4(a) to the image shown in FIG. 4(b), it includes a region other than the region corresponding to the field angle at which the image actually displayed on a monitor display or recorded is framed. In such a condition, the automatic focusing accuracy may be deteriorated. Referring to FIG. 5 for more detail, a line 5a indicates an entire picture frame, a line 5b indicates a region corresponding to a field angle at which an image is cut out to be enlarged by electronic zooming, and lines 5c and 5c' indicate distance measuring regions. As long as a distance measuring region is within the region corresponding to the field angle at which the image is cut out to be enlarged, as indicated at 5c, accurate focus detection in accordance with the image actually displayed can be achieved. However, if a distance measuring region is larger than or deviates from the region 5b corresponding to the field angle at which the image is cut out to be enlarged, as indicated at 5c', information other than information on the displayed image is used for focus detection, resulting in a reduction in the focus detection accuracy.

In the second embodiment, therefore, a distance measuring region is set so that the size and the position thereof are variable, and the size and the position of the distance measuring region are controlled in accordance with the electronic zooming operation so that the distance measuring region is always within the area defined by the field angle for actual enlargement processing or the like, whereby focusing can be performed accurately with respect to the region within the actual picture frame.

Figure 6:
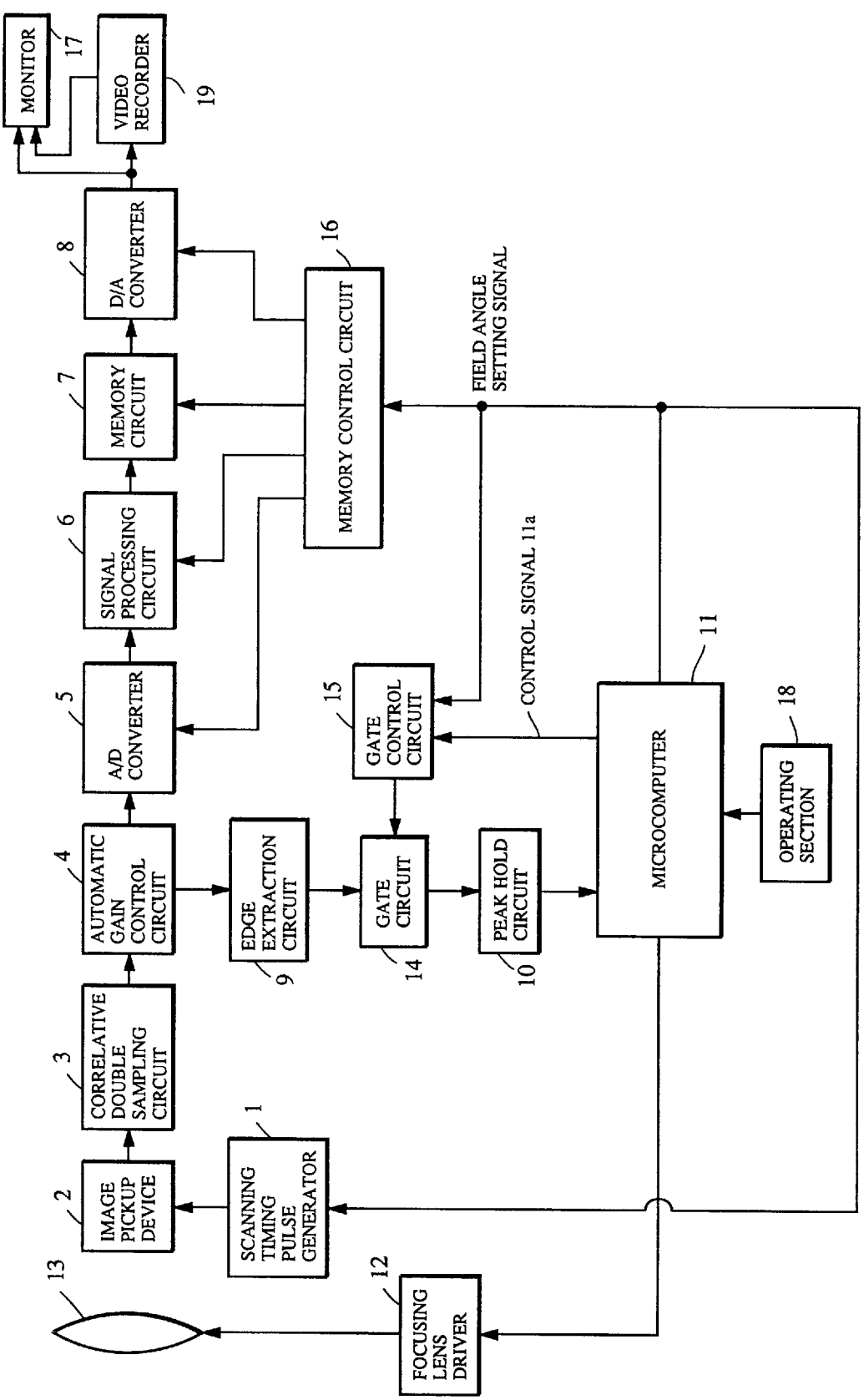
FIG. 6 is a block diagram of the second embodiment of the invention.

FIG. 6 is a block diagram of an arrangement achieving this effect. Components identical or corresponding to those shown in FIG. 1 are indicated by the same reference characters and the description for them will not be repeated. In FIG. 6, the same components as those omitted in FIG. 1, i.e., a monitor 17, a video recorder 19, a memory control circuit 16 and an operating section 18, and other components are illustrated as well as those illustrated in FIG. 1.

Referring to FIG. 6, an edge signal output from the edge detection circuit 9 is supplied to the gate circuit 14 for setting a distance measuring region. Only a part of the edge signal corresponding to a distance measuring region set in the picture frame (e.g., the distance measuring region indicated by line 5c in FIG. 5) is extracted in the gate circuit 14 and is supplied to the peak hold circuit 10. The operation is thereafter performed in the same manner as the first embodiment. That is, an output from the peak hold circuit 10 is supplied to the microcomputer 11 to control the focusing lens driver 12 so that its level is maximized, thereby controlling the focusing lens 13 in a mountaineering control manner.

A gate control circuit 15 controls the gate circuit 14 to control the position and the size of the distance measuring region (indicated by line 5c in FIG. 5) in the picture frame. The gate control circuit 15 controls the gate circuit 14 in an on-off manner to enable only a signal representing a desired region in the picture frame to pass. The gate control circuit 15 is controlled by a field angle setting signal (described below) which is output from the microcomputer 11 to determine the field angle at which an image is cut out from the picture frame.

The memory control circuit 16 controls the A/D converter 5, the signal processing circuit 6, the memory circuit 7 and the D/A converter 8 by the field angle setting signal output from the microcomputer 11 to perform electronic zooming based on cutting out a desired region in the picture frame and performing enlargement/interpolation processing.

That is, if a field angle at which an image in the picture frame is to be cut out and enlarged by electronic zooming is designated through the operating section 18, the microcomputer 11 outputs, on the basis of the designation, a field angle setting signal to the scanning timing pulse generator 1 and controls driving thereof to read out an image pickup signal corresponding to the cutting-out field angle from the image pickup device 2. A signal corresponding to the region set in the picture frame is thereby obtained.

The field angle setting signal is also supplied to the memory control circuit 16 to control the process of converting the signal of the region set in the picture frame from the analog form into the digital form, performing predetermined signal processing of the converted signal, controlling the writing rate and writing addresses to store the processed signal in the memory 7, controlling the reading rate and reading addresses at the time of reading out data in the memory and simultaneously performing processing for enlargement of the image, average-value interpolation and the like.

The field angle setting signal is also supplied to the gate control circuit 15. The gate circuit 14 is thereby controlled to limit the size and the position of the distance measuring region 5c so that the distance measuring region 5c is always positioned within the region 5b of the field angle at which image is cut out by electronic zooming.

It is thereby possible to perform focusing always accurately with respect to the set field angle by preventing occurrence of a situation where the distance measuring region includes, as shown in FIG. 5, image information other than the information limited by the field angle at which the image is cut out by electronic zooming.

The gate control circuit 15 is simultaneously controlled by a control signal 11a which is output from the microcomputer 11. The control signal 11a serves for a control such that the size of the distance measuring region is changed according to, for example, the depth of field which changes depending upon the focal length of the lens and the aperture and other factors.

It may be understood that the field angle setting signal limits the control signal 11a so that the distance measuring region is always set within the area of the field angle set by electronic zooming.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus comprising:
   (A) image pickup means for converting an image into an image pickup signal and outputting the image pickup signal;
   (B) signal processing means, connected to an output of said image pickup means, for performing predetermined processing of an image pickup signal output from said image pickup means to enable a field angle to be changed electronically by forming an interpolation signal from the output image pickup signal and by inserting the interpolation signal in the image pickup signal; and
   (C) focus detection means for detecting a focal state by extracting a predetermined signal component varying depending upon the focal state from the image pickup signal intermittently read out from the image pickup means but not yet interpolated.

2. An image pickup apparatus according to claim 1, wherein said signal processing means enlarges and interpolates an image.

3. An image pickup apparatus according to claim 2, wherein said signal processing means enlarges and interpolates an image by changing a transfer rate to perform intermittent reading when the image pickup signal is read out from said image pickup means, and by forming an interpolation signal from the read-out signal.

4. An image pickup apparatus according to claim 1, wherein said focus detection means makes a focus detection by extracting an edge component of an image from the image pickup signal.

5. An image pickup apparatus according to claim 4, further comprising drive means for driving a focusing lens to a focused state on the basis of an output from said focus detection means.

6. An image pickup apparatus, comprising:
- an image pickup device for converting an image into an image pickup signal and outputting the image pickup signal;
- signal processing means for electronically increasing the magnification of the image by intermittently reading out an image pickup signal from said image pickup device at a transfer rate determined by the magnification of the object image, by forming an interpolation signal from the read-out image pickup signal and by inserting the interpolation signal in the image pickup signal;
- extraction means for extracting a predetermined signal component varying depending upon a focal state from the image pickup signal intermittently read out from the image pickup device but not yet interpolated and not yet having electronically changed the magnification of the object image;
- determination means for determining in-focus/out-of-focus states on the basis of the signal component extracted by said extraction means; and
- focusing control means for controlling focusing on the basis of a result of the determination of in-focus/out-of-focus states made by said determination means.

7. An image pickup apparatus according to claim 6, further comprising monitor means for monitoring the image pickup signal processed to increase the image magnification.

8. An image pickup apparatus according to claim 6, further comprising a video recorder for recording the image pickup signal processed to increase the image magnification.

9. An image pickup apparatus comprising:
- (A) image pickup means;
- (B) signal processing means for performing predetermined processing of an image pickup signal output from said image pickup means to change a field angle electronically;
- (C) focus detection region setting means for setting a focus detection region for detecting a focus in a picture frame; and
- (D) control means for controlling said focus detection regions setting means so that the focus detection region is within an area defined by the field angle set by said signal processing means, wherein a size of the focus detection region is different from that of said area defined by the field angle.

10. An image pickup apparatus according to claim 9, wherein said focus detection region setting means changes the size and the position of the focus detection region.

11. An image pickup apparatus according to claim 10, wherein said control means controls the size and the position of the focus detection region so that no part of the focus detection region is located out of the region of the field angle set by said signal processing means.

12. An image pickup apparatus according to claim 9, further comprising focus detection means for making a focus detection by extracting a predetermined signal component varying depending upon a focal state from the part of the image pickup signal corresponding to the focus detection region.

13. An image pickup apparatus according to claim 12, wherein said predetermined signal component includes an edge component of an image.

14. An image pickup apparatus according to claim 9, wherein said signal processing means enlarges and interpolates an image by changing a transfer rate to perform intermittent reading when the image pickup signal is read out from said image pickup means, and by forming an interpolation signal from the read-out signal.

15. An image pickup apparatus comprising:
- (A') image pickup means for converting an image into an image signal and outputting the image signal;
- (A) electronic zooming means for processing the image signal output from said image pickup means for electronic zooming by forming an interpolation signal from the output image signal and by inserting the interpolation signal in the image signal; and
- (B) focus detection means for detecting a focal state from the image signal not yet interpolated by the processing of said electronic zooming means.

16. An image pickup apparatus according to claim 5, wherein said electronic zooming means enlarges and interpolates an image by changing a transfer rate to perform intermittent reading when the image signal is read out from said image pickup means, and by forming an interpolation signal from the read-out signal.

17. An image pickup apparatus according to claim 15, wherein said focus detection means makes a focus detection by extracting an edge component of an image from the image pickup signal.

18. An image pickup apparatus according to claim 17, further comprising drive means for driving a focusing lens to a focused state on the basis of an output from said focus detection means.

19. An image pickup apparatus according to claim 15, further comprising monitor means for monitoring the image pickup signal processed to increase the image magnification.

20. An image pickup apparatus comprising:
- (A) image pickup means for converting an image into an image pickup signal and outputting the image pickup signal;
- (B) signal processing means, connected to an output of said image pickup means, for performing predetermined digital processing of an image pickup signal output from said image pickup means to enable a field angle to be changed electronically by forming an interpolation signal from the output image pickup signal and by inserting the interpolation signal in the image pickup signal; and
- (C) detection means for detecting an image pickup condition by extracting a predetermined signal component varying depending upon the image pickup condition from the image pickup signal extracted at a point between the output of said image pickup means and said signal processing means and not yet interpolated by a processing of said signal processing means.

21. An image pickup apparatus according to claim 20, wherein said signal processing means enlarges and interpolates an image.

22. An image pickup apparatus according to claim 21, wherein said signal processing means enlarges and interpolates an image by changing a transfer rate to perform intermittent reading when the image pickup signal is read out from said image pickup means, and by forming an interpolation signal from the read-out signal.

23. An image pickup apparatus according to claim 21, wherein said detection means makes a focus detection by extracting an edge component of an image from the image pickup signal.

24. An image pickup apparatus according to claim 23, further comprising drive means for driving a focusing lens to a focused state on the basis of an output from said detection means.

25. An image pickup apparatus according to claim 20, further comprising monitor means for monitoring the image pickup signal processed to increase image magnification.

26. An image pickup apparatus according to claim 25, further comprising a video recorder for recording the image pickup signal processed to increase the image magnification.

27. An image pickup apparatus comprising:

image pickup means for converting an image into an image signal and outputting the image signal;

image storing means for storing the image signal output from said image pickup means;

signal processing means for performing predetermined processing of the image signal stored in said image storing means to enable a field angle to be changed electronically by forming an interpolation signal from the output image pickup signal and by inserting the interpolation signal in the image pickup signal; and focus detection means for detecting a focus state by extracting a predetermined signal component varying depending upon the focal state from the image pickup signal intermittently read from the image storing means but not yet interpolated.

28. An image pickup apparatus according to claim 27, wherein said focus detection means makes a focus detection by extracting an edge component of an image from the image signal.

29. An image pickup apparatus according to claim 28, further comprising drive means for driving a focusing lens to a focused state on the basis of an output from said focus detection means.

30. An image pickup apparatus according to claim 27, further comprising monitor means for monitoring the image pickup signal processed to increase the image magnification.

31. An image pickup apparatus according to claim 27, wherein said signal processing means performs electronical image enlargement.

\* \* \* \* \*